(12) United States Patent
Gustafson et al.

(10) Patent No.: US 9,650,744 B2
(45) Date of Patent: May 16, 2017

(54) SUCTION ROLL WITH SENSORS FOR DETECTING OPERATIONAL PARAMETERS

(71) Applicant: Stowe Woodward Licensco LLC, Youngsville, NC (US)

(72) Inventors: Eric J. Gustafson, Winchester, VA (US); Samuel H. Reaves, III, Stephens City, VA (US); Christopher Mason, Bunker Hill, WV (US)

(73) Assignee: Stowe Woodward Licensco LLC, Youngsville, NC (US)

( * ) Notice: Subject to any disclaimer, the term of this patent is extended or adjusted under 35 U.S.C. 154(b) by 94 days.

(21) Appl. No.: 14/823,460

(22) Filed: Aug. 11, 2015

(65) Prior Publication Data
US 2016/0076200 A1   Mar. 17, 2016

Related U.S. Application Data

(60) Provisional application No. 62/049,600, filed on Sep. 12, 2014, provisional application No. 62/168,362, filed on May 29, 2015.

(51) Int. Cl.
*D21F 7/06* (2006.01)
*D21F 3/10* (2006.01)
(Continued)

(52) U.S. Cl.
CPC ............... *D21F 7/06* (2013.01); *D21F 3/105* (2013.01); *G01K 13/08* (2013.01); *G01L 5/0085* (2013.01); *G01L 5/045* (2013.01)

(58) Field of Classification Search
CPC . D21F 7/06; D21F 3/105; G01L 5/045; G01L 5/0085; G01K 13/08
See application file for complete search history.

(56) References Cited

U.S. PATENT DOCUMENTS

| 2,815,907 A | 12/1957 | McCormick |
| 3,308,476 A | 3/1967 | Kleesattel |

(Continued)

FOREIGN PATENT DOCUMENTS

| DE | 863 133 | 1/1953 |
| DE | 199 20 133 | 11/2000 |

(Continued)

OTHER PUBLICATIONS

Preliminary Report of Issuance of Office Action for Japanese Patent Application No. 2011-125400, mailed on Dec. 21, 2012.

(Continued)

*Primary Examiner* — Jason L Vaughan
(74) *Attorney, Agent, or Firm* — Myers Bigel, P.A.

(57) ABSTRACT

An industrial roll includes: a substantially cylindrical shell having an outer surface and an internal lumen; a polymeric cover circumferentially overlying the shell outer surface, wherein the shell and cover have a plurality of through holes that provide fluid communication between the lumen and the atmosphere; and a sensing system. The sensing system includes: a plurality of sensors embedded in the cover, the sensors configured to sense an operating parameter of the roll and provide signals related to the operating parameter; at least one signal-carrying member connected with at least one of the sensors, wherein the signal-carrying member includes openings that align at least partially with some of the through holes of the shell and cover; and a processor operatively associated with the sensors that processes signals provided by the sensors.

33 Claims, 7 Drawing Sheets

US 9,650,744 B2

Page 2

(51) Int. Cl.
*G01K 13/08* (2006.01)
*G01L 5/00* (2006.01)
*G01L 5/04* (2006.01)

(56) References Cited

U.S. PATENT DOCUMENTS

| | | |
|---|---|---|
| 3,562,883 A | 2/1971 | Kobayashi |
| 3,665,650 A | 5/1972 | Przygocki |
| 3,962,911 A | 6/1976 | Grenlund |
| 4,016,756 A | 4/1977 | Kunkle |
| 4,233,011 A | 11/1980 | Bolender et al. |
| 4,352,481 A | 10/1982 | Forward |
| 4,366,025 A | 12/1982 | Gordon, Jr. et al. |
| 4,445,349 A | 5/1984 | Eibe |
| 4,498,383 A | 2/1985 | Pav et al. |
| 4,509,237 A | 4/1985 | Volz et al. |
| 4,729,153 A | 3/1988 | Pav et al. |
| 4,871,908 A | 10/1989 | Skuratovsky et al. |
| 4,898,012 A | 2/1990 | Jones et al. |
| 4,903,517 A | 2/1990 | Van Haag et al. |
| 4,910,985 A | 3/1990 | Ballyns |
| 4,938,045 A | 7/1990 | Rosenstock et al. |
| 5,048,353 A | 9/1991 | Justus |
| 5,086,220 A | 2/1992 | Berthold et al. |
| 5,379,652 A | 1/1995 | Allonen |
| 5,383,371 A | 1/1995 | Laitinen |
| 5,466,343 A | 11/1995 | Kankaanpaa |
| 5,535,240 A | 7/1996 | Carney et al. |
| 5,562,027 A | 10/1996 | Moore |
| 5,592,875 A | 1/1997 | Moschel |
| 5,684,871 A | 11/1997 | Devon et al. |
| 5,684,912 A | 11/1997 | Slaney et al. |
| 5,699,729 A | 12/1997 | Moschel |
| 5,739,626 A | 4/1998 | Kojima et al. |
| 5,848,097 A | 12/1998 | Carney et al. |
| 5,874,723 A | 2/1999 | Hasegawa et al. |
| 5,915,648 A | 6/1999 | Madrzak et al. |
| 5,925,220 A | 7/1999 | Hirsch et al. |
| 5,947,401 A | 9/1999 | Niccum |
| 5,953,230 A | 9/1999 | Moore |
| 6,006,100 A | 12/1999 | Koenck et al. |
| 6,205,369 B1 | 3/2001 | Moore |
| 6,284,103 B1 | 9/2001 | Eng et al. |
| 6,328,681 B1 | 12/2001 | Stephens |
| 6,341,522 B1 | 1/2002 | Goss et al. |
| 6,354,013 B1 | 3/2002 | Mucke et al. |
| 6,361,483 B1 | 3/2002 | Kirchner |
| 6,375,602 B1 | 4/2002 | Jones |
| 6,430,459 B1 | 8/2002 | Moore |
| 6,441,904 B1 | 8/2002 | Shakespeare |
| 6,568,285 B1 | 5/2003 | Moore |
| 6,617,764 B2 | 9/2003 | Sebastian et al. |
| 6,752,908 B2 | 6/2004 | Gustafson et al. |
| 6,874,232 B2 | 4/2005 | Madden et al. |
| 6,892,563 B2 | 5/2005 | Gustafson et al. |
| 6,910,376 B2 | 6/2005 | Maenpaa |
| 6,981,935 B2 | 1/2006 | Gustafson |
| 6,988,398 B2 | 1/2006 | Saloniemi et al. |
| 7,185,537 B2 | 3/2007 | Muhs |
| 7,225,688 B2 | 6/2007 | Moore et al. |
| 7,392,715 B2 | 7/2008 | Moore et al. |
| 7,572,214 B2 | 8/2009 | Gustafson |
| 7,581,456 B2 | 9/2009 | Moore et al. |
| 7,963,180 B2 | 6/2011 | Moore et al. |
| 8,236,141 B2 | 8/2012 | Pak |
| 8,236,414 B2 | 8/2012 | Piluso et al. |
| 8,346,501 B2 | 1/2013 | Pak |
| 8,474,333 B2 | 7/2013 | Berendes et al. |
| 8,475,347 B2 | 7/2013 | Gustafson et al. |
| 2003/0115947 A1 | 6/2003 | Saloniemi et al. |
| 2004/0053758 A1 | 3/2004 | Gustafson |
| 2005/0000303 A1 | 1/2005 | Moore et al. |
| 2005/0261115 A1 | 11/2005 | Moore |
| 2006/0090574 A1 | 5/2006 | Moore et al. |
| 2006/0248723 A1 | 11/2006 | Gustafson |
| 2008/0264184 A1 | 10/2008 | Moore et al. |
| 2009/0320612 A1 | 12/2009 | Moore et al. |
| 2010/0324856 A1 | 12/2010 | Pak |
| 2011/0226070 A1 | 9/2011 | Berendes et al. |
| 2012/0310596 A1 | 12/2012 | Gustafson et al. |
| 2014/0374460 A1 | 12/2014 | Breineder et al. |

FOREIGN PATENT DOCUMENTS

| | | |
|---|---|---|
| EP | 0 538 221 A2 | 4/1993 |
| EP | 1 493 565 A2 | 1/2005 |
| EP | 1 653 207 A2 | 5/2006 |
| EP | 1 719 836 A1 | 11/2006 |
| FR | 2 769 379 | 4/1999 |
| JP | 2006164244 A | 6/2006 |
| JP | 2009298265 | 12/2009 |
| WO | WO 96/34262 A1 | 10/1996 |
| WO | WO 01/53787 A1 | 7/2001 |
| WO | WO 2005/113891 A1 | 12/2005 |
| WO | WO 2010/043433 | 4/2010 |

OTHER PUBLICATIONS

Examiner's Report for Canadian Application No. 2,741,931 mailed on Jul. 11, 2012.

Anonymous "Les capteurs à fibres optiques opérationnels?" *Mesures Regulation Automatisme*, FR, CFW, Paris, Oct. 20, 1986, pp. 49-51, 53, 55, vol. 51, No. 13 (XP002083807).

Bazergui, A., and M.L. Meyer, "Embedded Strain Gages for the Measurement of Strains in Rolling Contact," *Experimental Mechanics*, Oct. 1968, pp. 433-441.

Keller, S.F., "Measurement of the Pressure-Time Profile in a Rolling Calender Nip," *77th Annual Meeting of the Canadian Section of the Pulp and Paper Assn.* 1991, pp. B89-B96.

Knowles, S.F., et al., "Multiple Microbending Optical-fibre Sensors for Measurement of Fuel Quantity in Aircraft Fuel Tanks," *Sensors and Actuators*, Jun. 15, 1998, pp. 320-323, vol. 68. No. 1-3 (XP004139852).

Koriseva, J., et al., "Soft Calendar Nip: An Interesting Subject for Research and Measurement," *Paper and Timber*, 1991, pp. 419-423, vol. 73, No. 5.

McCollum, T., and G. B. Spector, "Fiber Optic Microbend Sensor for Detection of Dynamic Fluid Pressure at Gear Interfaces," *Rev. Sci. Instrum.*, Mar. 1, 1994, pp. 724-729. vol. 65, No. 3 (XP000435198).

McNamee, J.P., "A Study of Rubber Covered Press Roll Nip Dynamics, Part 1," *The Journal of the Technical Association of the Pulp and Paper Industry*, Dec. 1965. pp. 673-679, vol. 48, No. 12.

Merriman, T.L., "Transducers and Techniques of Contact Pressure Measurement," Paper presented at *The Society for Experimental Mechanics*, Spring Conference, Jun. 1991, pp. 318-320.

Parish, G.J., "Measurements of Pressure Distribution Between Metal and Rubber Covered Rollers," *British Journal of Applied Physics*, Apr. 1959, pp. 158-161, vol. 9.

Spengos, A.C., "Experimental Investigation of Rolling Contact" *Journal of Applied Mechanics*, Dec. 1965, pp. 859-864.

International Search Report for PCT/US01/02013, mailed May 22, 2001.

International Search Report for PCT/US03/18895 mailed Sep. 30, 2003.

International Search Report for PCT/US2005/016456 mailed Sep. 5, 2005.

International Search Report and Written Opinion for PCT/US2010/038581 mailed Dec. 23, 2010.

European Search Report for EP 05 02 7237, dated Aug. 29, 2006.

The Extended European Search Report for European Patent Application No. 10166806.9-2314; dated Oct. 13, 2010.

International Search Report and Written Opinion for corresponding PCT Application No. PCT/US2015/048863, date of mailing Mar. 3, 2015, 16 pages.

ize that some of the holes would overlie portions of the sensors. Conventionally, the sensors and accompanying signal carrier (e.g., a fiber or cable) are applied to the metallic shell prior to the application of the polymeric cover, and the suction holes are drilled after the application and curing of the cover. Thus, drilling holes in the cover in a conventional manner would almost certainly damage the sensors, and may well damage the signal carrier. Also, during curing of the cover often the polymeric material shifts slightly on the core, and in turn may shift the positions of the signal carrier and sensors; thus, it is not always possible to determine precisely the position of the signal carrier and sensors beneath the cover, and the shifting core may move a sensor or signal carrier to a position directly beneath a hole. Further, ordinarily optical fiber has a relative high minimum bending radius for suitable performance; thus, if optical fiber is employed as the signal carrier, trying to weave an optical fiber between prospective holes in the roll may result in unacceptable optical transmission within the fiber.

One approach to the use of sensors in a suction roll is described in U.S. Pat. No. 6,981,935 to Gustafson, which proposes that the signal carrier trace a path that follows the oblique angle of the suction roll drill pattern. This arrangement enables the signal carrier to be applied to the base layer of the roll cover prior to the application of the outer layer cover but still avoid damage to the signal carrier during drilling of the drainage holes. In some embodiments the sensor may be sufficiently large that it does not fit within the spaces between drainage holes. In such instances, a blind drilled hole may be formed in the cover over the sensor rather than a through hole so that the hole pattern in the cover is not disturbed. However, this solution may not be optimal for all roll covers. One approach utilizes sensors with apertures, with the drainage holes aligned with the apertures (see U.S. Pat. No. 7,572,214 to Gustafson (Gustafson), the disclosure of which is hereby incorporated herein in its entirety). Although this approach has promise, modifications that improve the design may be desirable.

SUCTION ROLL WITH SENSORS FOR DETECTING OPERATIONAL PARAMETERS

RELATED APPLICATION

The present application claims priority from and the benefit of U.S. Provisional Patent Application Nos. 62/049,600, filed Sep. 12, 2014, and 62/168,362, filed May 29, 2015, the disclosures of which are hereby incorporated therein in their entireties.

FIELD OF THE INVENTION

The present invention relates generally to industrial rolls, and more particularly to rolls for papermaking.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

A papermaking machine may include one or more suction rolls placed at various positions within the machine to draw moisture from a belt (such as a press felt) and/or the fiber web. Each suction roll is typically constructed from a metallic shell covered by a polymeric cover with a plurality of holes extending radially therethrough. Vacuum pressure is applied with a suction box located in the interior of the suction roll shell. Water is drawn into the radially-extending holes and is either propelled centrifugally from the holes after they pass out of the suction zone or transported from the interior of the suction roll shell through appropriate fluid conduits or piping. The holes are typically formed in a grid-like pattern by a multi-bit drill that forms a line of multiple holes at once (for example, the drill may form fifty aligned holes at once). In many grid patterns, the holes are arranged such that rows and columns of holes are at an oblique angle to the longitudinal axis of the roll.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a suction roll can, therefore, impact the quality of paper produced with the paper machine.

Other properties of a suction roll can also be important. For example, the stress and strain experienced by the roll cover in the cross machine direction can provide information about the durability and dimensional stability of the cover. In addition, the temperature profile of the roll can assist in identifying potential problem areas of the cover.

It is known to include pressure and/or temperature sensors in the cover of an industrial roll. For example, U.S. Pat. No. 5,699,729 to Moschel et al. describes a roll with a helically-disposed fiber that includes a plurality of pressure sensors embedded in the polymeric cover of the roll. However, a suction roll of the type described above presents technical challenges that a conventional roll does not. For example, suction roll hole patterns are ordinarily designed with sufficient density that some of the holes would overlie portions

SUMMARY

As a first aspect, embodiments of the invention are directed to an industrial roll. The industrial roll comprises: a substantially cylindrical shell having an outer surface and an internal lumen; a polymeric cover circumferentially overlying the shell outer surface, wherein the shell and cover have a plurality of through holes that provide fluid communication between the lumen and the atmosphere; and a sensing system. The sensing system comprises a plurality of sensors embedded in the cover, the sensors configured to sense an operating parameter of the roll and provide signals related to the operating parameter. At least one signal-carrying member is connected with at least one of the sensors, wherein the signal-carrying member includes openings that align at least partially with some of the through holes of the shell and cover. A processor is operatively associated with the sensors that processes signals provided by the sensors.

As a second aspect, embodiments of the invention are directed to an industrial roll, comprising: a substantially cylindrical shell having an outer surface and an internal lumen; a polymeric cover circumferentially overlying the shell outer surface, wherein the shell and cover have a plurality of through holes that provide fluid communication between the lumen and the atmosphere; and a sensing system. The sensing system comprises a plurality of sensors embedded in the cover, the sensors configured to sense an operating parameter of the roll and provide signals related to the operating parameter, wherein at least some of the sensors include an aperture, and wherein some of the through holes of the cover extend through respective apertures of the sensor. A plurality of centering members is inserted through the apertures of the sensors and into the through holes, each of the centering members having an internal bore that permits fluid communication between the lumen and the atmosphere. A processor is operatively associated with the sensors that processes signals provided by the sensors.

As a third aspect, embodiments of the invention are directed to an industrial roll, comprising: a substantially cylindrical shell having an outer surface and an internal lumen; a polymeric cover circumferentially overlying the shell outer surface, wherein the shell and cover have a plurality of through holes that provide fluid communication between the lumen and the atmosphere, the through holes being arranged in an array of rows and columns; and a sensing system. The sensing system comprises a plurality of sensors embedded in the cover, the sensors configured to sense an operating parameter of the roll and provide signals related to the operating parameter, wherein at least some of the sensors include an aperture, and wherein some of the through holes of the cover extend through respective apertures of the sensors; a processor operatively associated with the sensors that processes signals provided by the sensors; and at least one signal-carrying member connected with at least one of the sensors, the signal-carrying member comprising a first segment that is routed between two columns of through holes and a second segment merging with the first segment that is routed between two rows of through holes.

DETAILED DESCRIPTION OF EMBODIMENTS OF THE INVENTION

Figure 1:
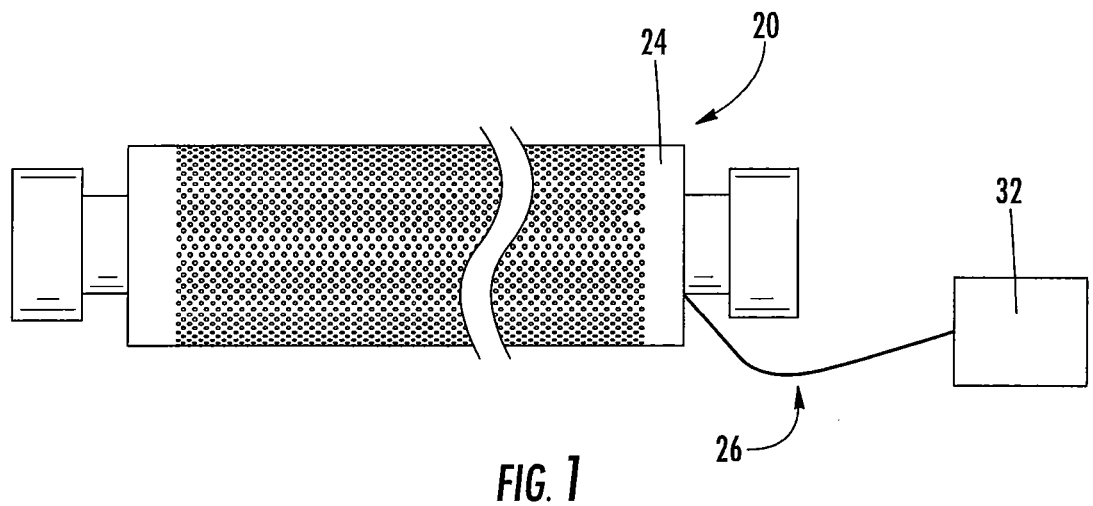
FIG. 1 is a gage view of a suction roll and detecting system of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items. Where used, the terms "attached", "connected", "interconnected", "contacting", "coupled", "mounted" and the like can mean either direct or indirect attachment or contact between elements, unless stated otherwise.

Referring now to the figures, a suction roll, designated broadly at 20, is illustrated in FIG. 1. The suction roll 20 includes a hollow cylindrical shell or core 22 (see FIG. 3) and a cover 24 (typically formed of one or more polymeric materials) that encircles the shell 22. A sensing system 26 for sensing pressure, temperature, moisture, or some other operational parameter of interest includes a pair of electrical leads 28a, 28b and a plurality of sensors 30 (see FIGS. 2 and 6), each of which is embedded in the cover 24. As used herein, a sensor being "embedded" in the cover means that the sensor is either entirely contained within the cover 24 or it is mounted on the core 22 and completely covered by the cover 24. The sensing system 26 also includes a processor 32 that processes signals produced by the sensors 30.

The shell 22 (FIG. 3) is typically formed of a corrosion-resistant metallic material, such as stainless steel or bronze. A suction box (not shown) is typically positioned within the lumen of the shell 22 to apply negative pressure (i.e., suction) through holes in the shell 22 and cover 24. Typically, the shell 22 will already include through holes that will later align with through holes 82 in the cover 24. An exemplary shell and suction box combination is illustrated and described in U.S. Pat. No. 6,358,370 to Huttunen, the disclosure of which is hereby incorporated herein in its entirety.

The cover 24 can take any form and can be formed of any polymeric and/or elastomeric material recognized by those skilled in this art to be suitable for use with a suction roll. Exemplary materials include natural rubber, synthetic rubbers such as neoprene, styrene-butadiene (SBR), nitrile rubber, chlorosulfonated polyethylene ("CSPE"—also known under the trade name HYPALON), EDPM (the name given to an ethylene-propylene terpolymer formed of ethylene-propylene diene monomer), epoxy, and polyurethane.

Figure 3:
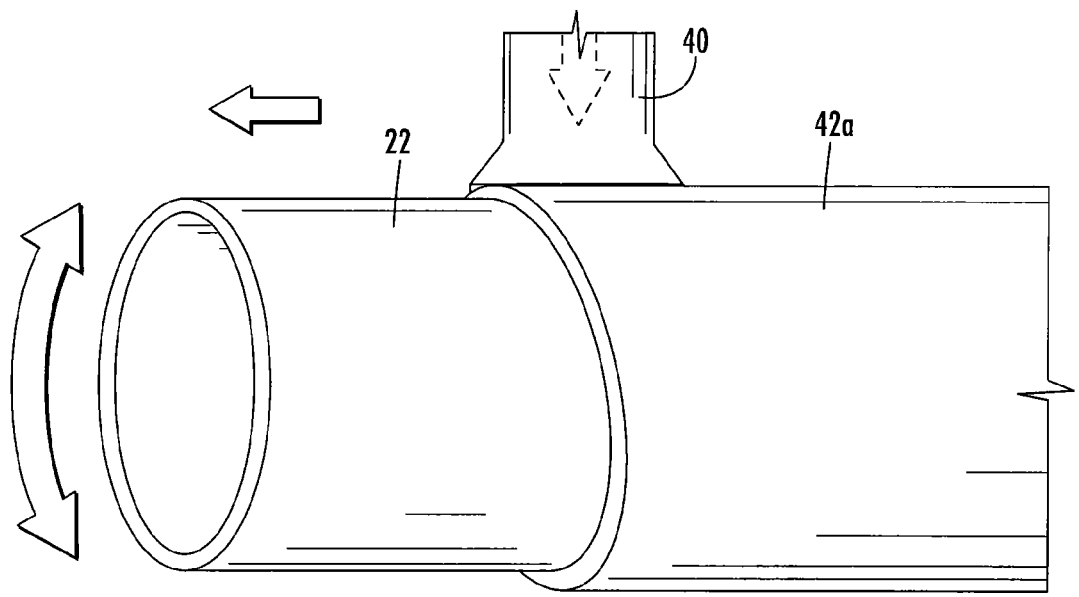
FIG. 3 is a gage perspective view of a shell and an inner base layer formed in the manufacture of the suction roll of FIG. 1.
Figure 7:
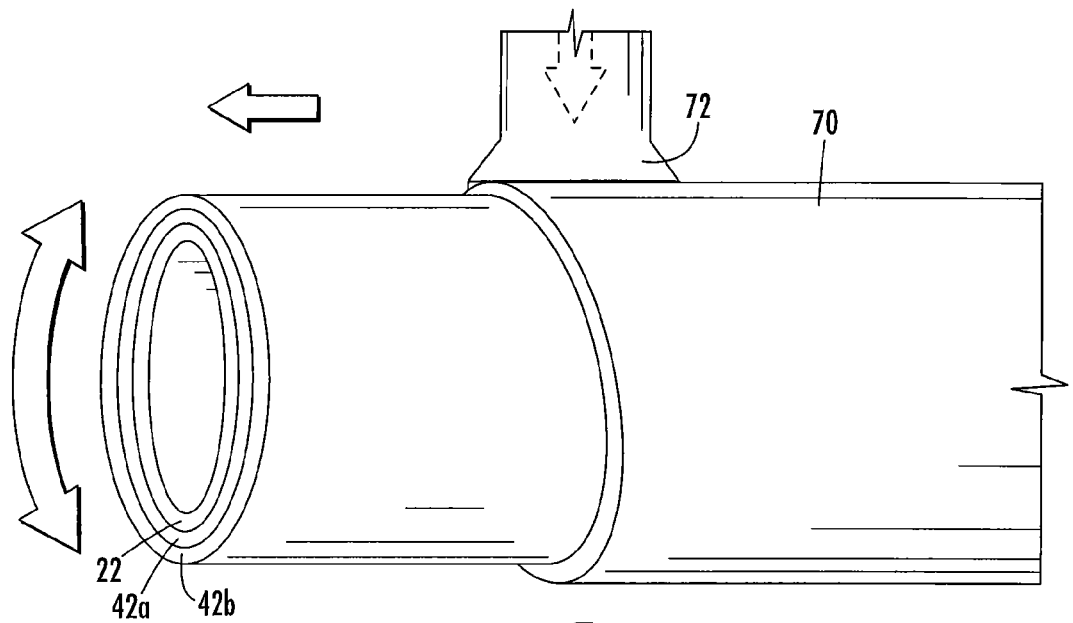
FIG. 7 is a gage perspective view of the topstock layer being applied over the outer base layer of the suction roll of FIG. 1.

In many instances, the cover 24 will comprise multiple layers. FIGS. 3 and 7 illustrate that an inner base layer 42a, an outer base layer 42b and a topstock layer 70 are applied; additional layers, such as a "tie-in" layer between the base and topstock layers 42a, 42b, 70 and an adhesive layer between the shell 22 and the inner base layer 42, may also be included). The cover 24 may also include reinforcing and filler materials, additives, and the like. Exemplary additional materials are discussed in U.S. Pat. No. 6,328,681 to Stephens and U.S. Pat. No. 6,375,602 to Jones and U.S. Pat. No. 6,981,935 to Gustafson, the disclosures of each of which are hereby incorporated herein in their entireties.

Figure 2:
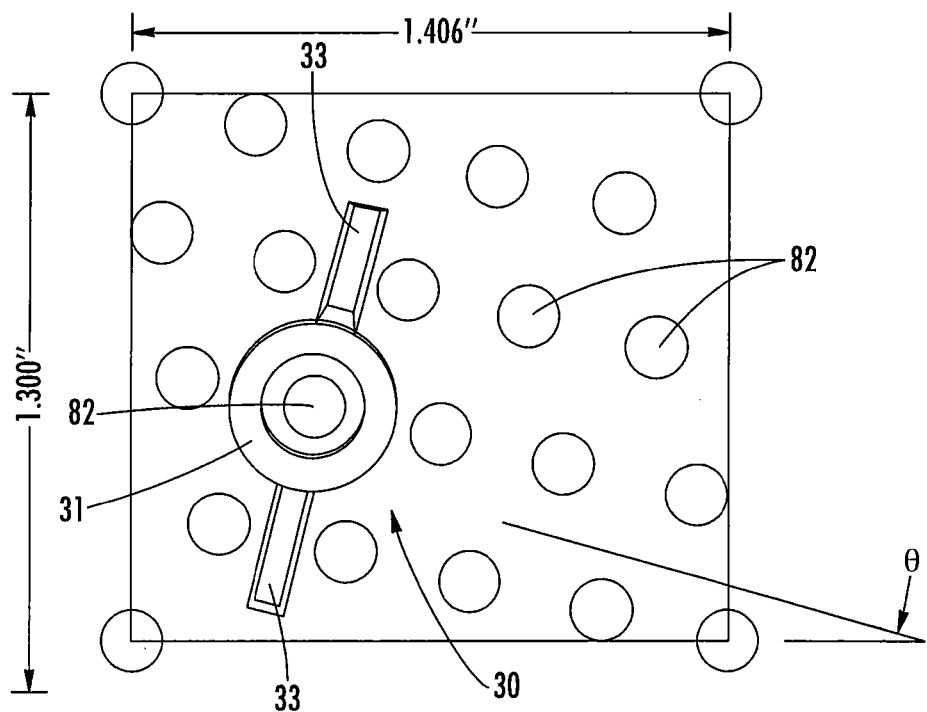
FIG. 2 is a greatly enlarged view of a sensor within a pattern of holes of the suction roll of FIG. 1.

The cover 24 has a pattern of holes (which includes through holes 82 and may also include blind drilled holes) that may be any of the hole patterns conventionally employed with suction rolls or recognized to be suitable for applying suction to an overlying papermaker's felt or fabric and/or a paper web as it travels over the roll 20. Typically, the holes are between about 0.060 and 0.250 inches in diameter and are spaced to be about 0.060 to 0.375 inches from one another. A portion 86 of one exemplary hole pattern is illustrated in FIG. 2. The portion 86 can be defined by a frame that represents the height or circumferential expanse of the pattern (this dimension is typically about 0.5 to 1.5 inches) and a drill spacing that represents the width or axial expanse of the pattern (this dimension is typically about 1.0 to 3.0 inches). As is conventional, the columns of holes 82 define an oblique angle $\theta$ (typically between about 5 and 20 degrees) relative to a plane that is perpendicular to the longitudinal axis of the roll 20.

Referring now to FIG. 2, the sensor 30 shown therein has an internal aperture 31 as described in Gustafson, supra, and also includes wings 33 for the attachment of the electrical leads 28a, 28b. The sensors 30 can take any form recognized by those skilled in this art as being suitable for detecting the operational parameter of interest (e.g., stress, strain, pressure or temperature). Exemplary pressure sensors include piezoelectric sensors (particularly piezoelectric sensors formed of piezoelectric ceramic, such as PZT-type lead-zirgonate-titanate, quartz, synthetic quartz, tourmaline, gallium orthophosphate, CGG ($Ca_3Ga_2Ge_4O_{14}$), lithium niobate, lithium tantalite, Rochelle salt, and lithium sulfate-monohydrate), force-resistive sensors, membrane sensors and the like. The internal aperture 31 is sized to be larger than an associated through hole 82 of the cover 24; a typical dimension of the aperture 31 is between about 0.080 and 0.5 inch. The outer dimension of the sensor 30 is selected so that the sensor 30 does not overlie or extend into any of the surrounding through holes 82; a typical outer dimension of the sensor 30 is between about 0.125 and 0.300 inch. In the illustrated embodiment, the sensors 30 are annular, such that the internal aperture 31 is circular. However, other shapes of sensors and/or apertures may also be suitable. For example, the sensor 30 itself may be square, rectangular, triangular, oval, hexagonal, octagonal, or the like, and the aperture may also take any of these shapes. Alternatively, rather than the aperture 31 being internal to the sensor 30 (i.e., the aperture 31 having a closed perimeter), the aperture 31 may be open-ended, such that the sensor 30 takes a "U" or "C" shape. The sensors 30 are distributed around the circumference of the roll 20 such that most of the sensors 30 are generally circumferentially equidistant from each other; one or more sensors 30 may be spaced differently for the purpose of determining the rotational position of the roll 20; see, e.g., U.S. Pat. No. 8,346,501, the disclosure of which is hereby incorporated herein by reference in its entirety.

The wings 33 of the sensor 30 are formed such that they extend radially outwardly from the lower surface of the body of the sensor 30 and are substantially coplanar with each other; this configuration and its advantages are discussed in U.S. Pat. No. 8,236,141, the disclosure of which is hereby incorporated herein by reference in its entirety.

As can be seen in FIG. 2, each sensor 30 is to be located so that its aperture 31 is aligned with a through hole 82 of the cover 24. To aid in the location of the sensor 30, a rivet 60 (shown in FIG. 5) can be inserted through the aperture 31 of the sensor 30, then into the underlying through hole 82. Employment of the rivet 60, which is sized so that the diameter of its shaft is slightly smaller than the diameter of the aperture 31, can maintain the sensor 30 in a position that allows through holes to be formed around it without being damaged. Once the rivet 60 is inserted through the sensor 30 and into the through hole 82, a bore 62 is drilled in the center of the rivet 60 to re-form the through hole 82.

As is discussed in U.S. Pat. No. 6,981,935, supra, in some prior suction rolls that included sensing systems, the leads that connect the sensors to a processor are routed between drainage holes (i.e., at the same angle $\theta$ as the columns of the drainage holes) to prevent damage to the leads during drilling of the drainage holes. This configuration typically requires that the leads form a helix with multiple rotations or "coils" around the roll. One drawback of this approach is that the additional length of leads required can reduce signal strength and accuracy and make the system more prone to damage/failure.

Figure 6:
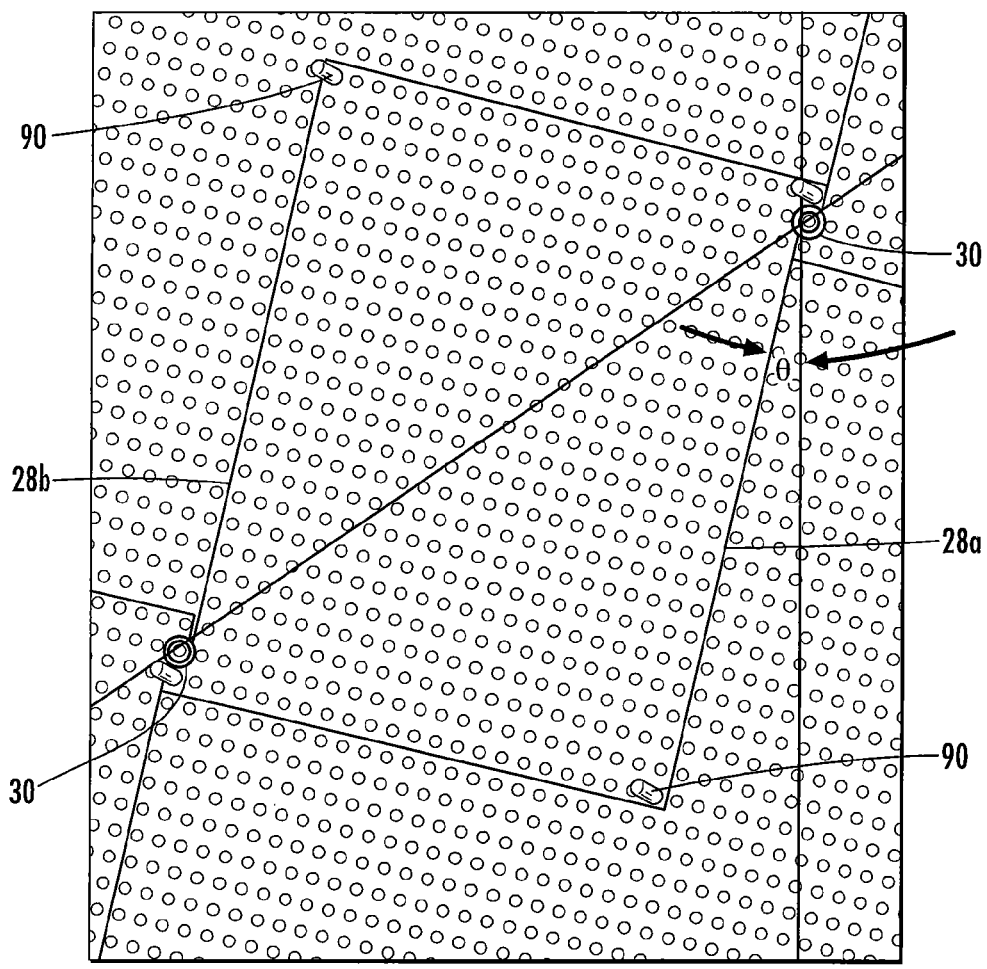
FIG. 6 is a enlarged view of leads and two sensors of FIG. 5 positioned on the cover base layer, with the sensor positioned to encircle one of the scored circles formed in the scoring procedure shown in FIG. 4.

An alternative lead routing approach is illustrated in FIG. 6. In this approach, the sensors 30 themselves define a single helical coil along the length of the roll (in much the same manner as the sensors of non-suction rolls: see, for example, U.S. Pat. No. 8,346,501, the disclosure of which is hereby incorporated herein in its entirety). The leads 28a, 28b are routed between the through holes by following a two-segment path between sensors, with the leads 28a, 28b following the angle $\theta$ between columns of through holes 82 in a first segment, then passing between rows of through holes 82 in a second segment that is substantially perpendicular to the pattern angle $\theta$.

Figure 12:
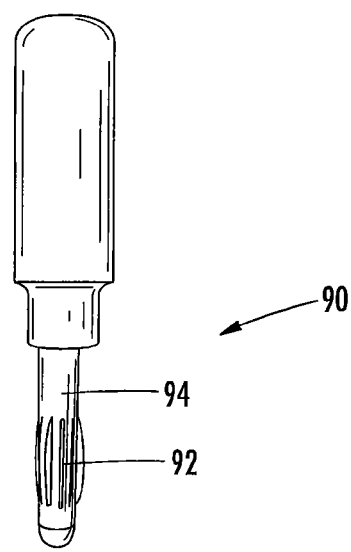
FIG. 12 is a front view of an alignment peg that may be employed according to embodiments of the invention.

As can be seen in FIG. 6, the routing of the leads 28a, 28b can be performed by identifying the through hole 82 over which a sensor 30 is to be mounted, then placing alignment pegs 90 in appropriate through holes 82 that enable the leads 28a, 28b to be routed between the rows and columns of through holes 82. As can be seen in FIG. 12, the alignment pegs 90 may have a spring-loaded stem 92 with a groove 94 that can receive the leads during alignment. Although this arrangement of leads 28a, 28b is longer than that of a non-suction roll with a single helical coil of sensors, the arrangement is much shorter than a multiple coil helix such as that shown in Gustafson.

Referring again to FIG. 6, the leads 28a, 28b of the sensing system 26 can be any signal-carrying members recognized by those skilled in this art as being suitable for the passage of electrical signals in a suction roll. As an alternative, a wireless system, such as that described in U.S. Pat. No. 7,392,715 to Moore may be employed.

Referring once again to FIG. 1, the processor 32 is typically a personal computer or similar data exchange device, such as the distributive control system of a paper mill, that is operatively associated with the sensors 30 and that can process signals from the sensors 30 into useful, easily understood information. It is preferred that a wireless communication mode, such as RF signaling, be used to transmit the data collected from the sensors 30 to the processing unit 32. Other alternative configurations include slip ring connectors that enable the signals to be transmitted from the sensors 30 to the processor 32. Suitable exemplary processing units are discussed in U.S. Pat. Nos. 5,562,027 and 7,392,715 to Moore and U.S. Pat. No. 6,752,908 to Gustafson et al., the disclosures of which are hereby incorporated herein in their entireties.

The suction roll 20 can be manufactured in the manner described below and illustrated in FIGS. 3-8. In this method, initially the shell 22 is covered with a portion of the cover 24 (such as the inner base layer 42a). As can be seen in FIG. 3, the inner base layer 42a can be applied with an extrusion nozzle 40, although the inner base layer 42a may be applied by other techniques known to those skilled in this art. Typically for a suction roll the inner base layer 42a is formed of rubber or epoxy-based composite materials. It will also be understood by those skilled in this art that, although the steps described below and illustrated in FIGS. 3 and 4 are shown to be performed on an inner base layer 42a, other internal layers of a cover 24 (such as the outer base layer 42b or a tie-in layer) may also serve as the underlying surface for the leads 28a, 28b and sensors 30.

Figure 4:
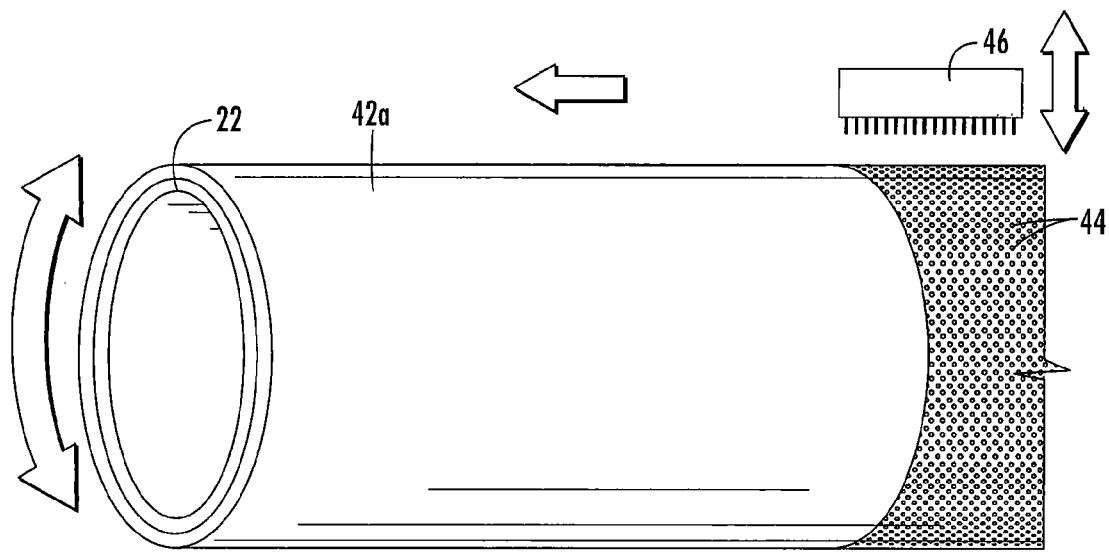
FIG. 4 is a gage perspective view of shell and inner base layer of FIG. 2 being scored with a drill.

Referring now to FIG. 4, the inner base layer 42a of the cover 24 is scored or otherwise marked, for example with a multi-bit drill 46, with score marks 44 that correspond to a desired pattern of holes 82 that will ultimately be formed in the roll 20. The score marks 44 should be of sufficient depth to be visible in order to indicate the locations where holes will ultimately be formed, but need not be any deeper.

Figure 5:
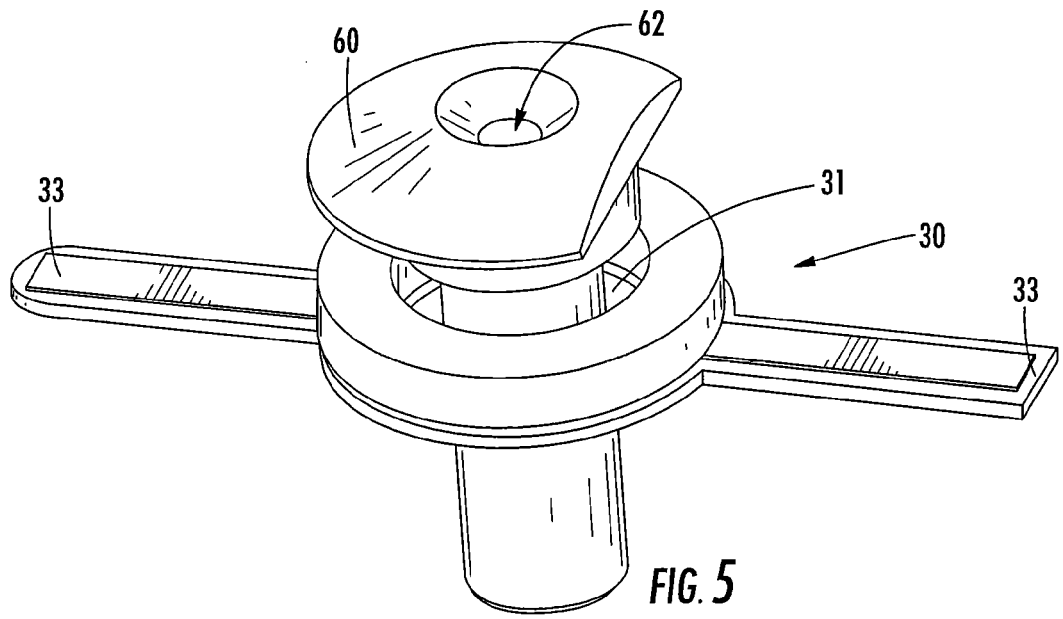
FIG. 5 is a greatly enlarged perspective view of a sensor and its mounting rivet for the suction roll of FIG. 1.

Referring now to FIGS. 5 and 6, after score marks 44 are formed in the inner base layer 42a, the leads 28a, 28b and sensors 30 of the sensor system 26 are installed. The locations of the sensors 30 are mapped along a designated path (typically a single coiled helix). For each sensor 30, a nearest score mark 44 is determined, and a hole is drilled there. Appropriate score marks 44 are also located for the placement of alignment pegs 90 that enable the leads 28a, 28b to be routed between sensors 30 between the columns and rows of score marks 44.

Rivets 60 are inserted through the apertures 31 of the sensors 30, then into the designated holes. The rivets 60 will enable the sensors 30 to remain substantially centered over the holes and away from adjacent holes 82. In some embodiments, the rivets 60 are mounted via epoxy, which can protect the sensors 30 from water during papermaking. Once the rivet 60 and sensor 30 are mounted in the designated hole, a hole is drilled through the rivet 60 to serve as a through hole 82. The leads 28a, 28b are mounted to the inner base 42a by any manner known to be suitable for such mounting; in some embodiments, the leads 28a, 28b are sealed into place with varnish, with the solder joints between the leads 28a, 28b and the wings 33 of the sensor 30 protected with epoxy.

Referring now to FIG. 7, once the sensors 30 and leads 28a, 28b have been positioned and affixed to the inner base layer 42a, the remainder of the cover 24 is applied. FIG. 7 illustrates the application of the top stock layer 70 with an extrusion nozzle 72; a similar technique can be used to apply the outer base layer 42b over the inner base layer 42a. In some instances, either or both of the inner base layer 42a and the outer base layer 42b may be ground prior to the application of the next overlying layer. Those skilled in this art will appreciate that the application of the outer base layer 42b and the top stock layer 70 can be carried out by any technique recognized as being suitable for such application. In a typical suction roll, the outer base layer 42b is formed of rubber or epoxy-based composite materials and the top-stock layer 70 is formed of rubber or polyurethane. As noted above, the present invention is intended to include rolls having covers that include only a base layer and top stock layer as well as rolls having covers with additional intermediate layers. Application of the top stock layer 70 is followed by curing, techniques for which are well-known to those skilled in this art and need not be described in detail herein.

Figure 8:
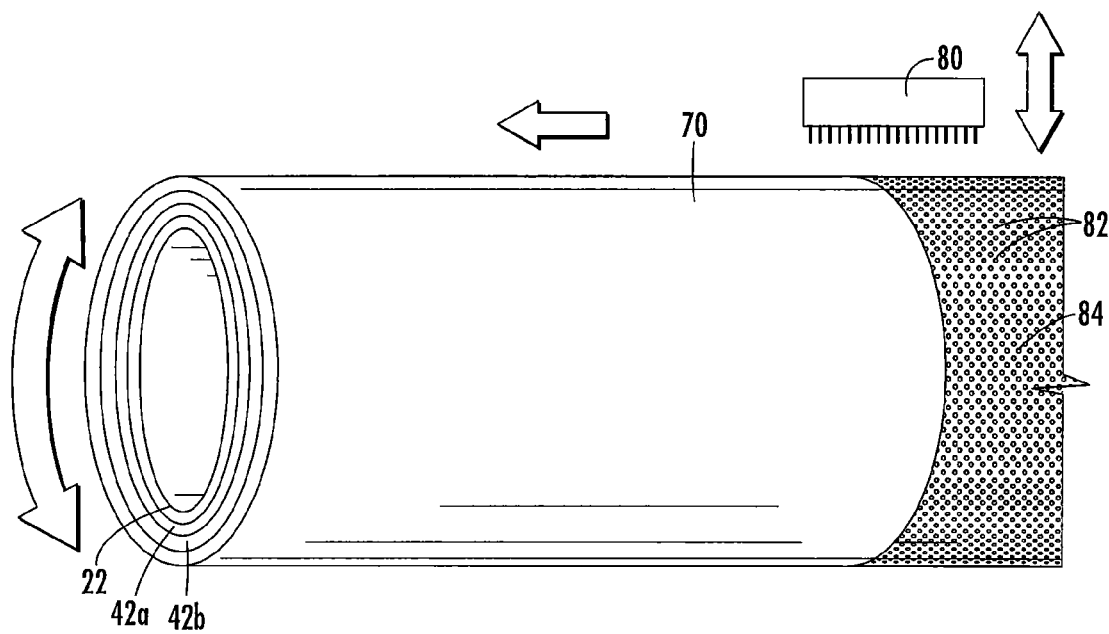
FIG. 8 is a gage perspective view of the topstock layer of FIG. 7 and shell and the inner and outer base layers of FIGS. 3 and 7 being drilled with a drill.

Referring now to FIG. 8, after the top stock layer 70 is cured, the through holes 82 and any blind drilled holes are formed in the cover 24 and, in the event that through holes 82 have not already been formed in the shell 22, are also formed therein. The through holes 82 can be formed by any technique known to those skilled in this art, but are preferably formed with a multi-bit drill 80 (an exemplary drill is the DRILLMATIC machine, available from Safop, Pordenone, Italy). In some embodiments, the through holes 82 associated with sensors 30 may be drilled by hand.

It can be seen that embodiments of sensors described above can address some of the issues presented by suction rolls. By including an aperture in the sensor through which the through holes can extend, rolls of the present invention can avoid interfering with the hole patterns of suction rolls and need not have blind drilled holes in positions over the sensors. The inclusion of the rivets 60 can help to center, and in turn protect, the sensors 30. Further, the two-segment path followed by the leads 28a, 28b between adjacent sensors 30 can shorten the overall signal path of the sensor data, thereby improving signal quality and performance.

Figure 9:
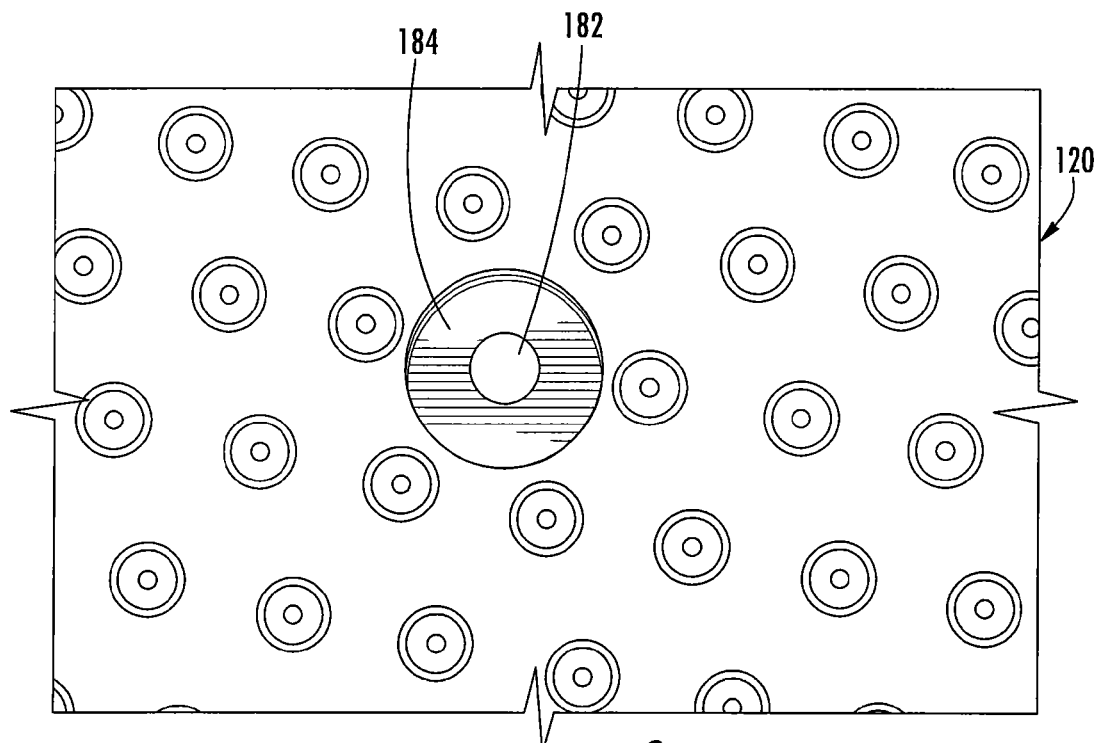
FIG. 9 is a gage view of a portion of a suction roll with a counterbore according to additional embodiments of the invention.
Figure 10:
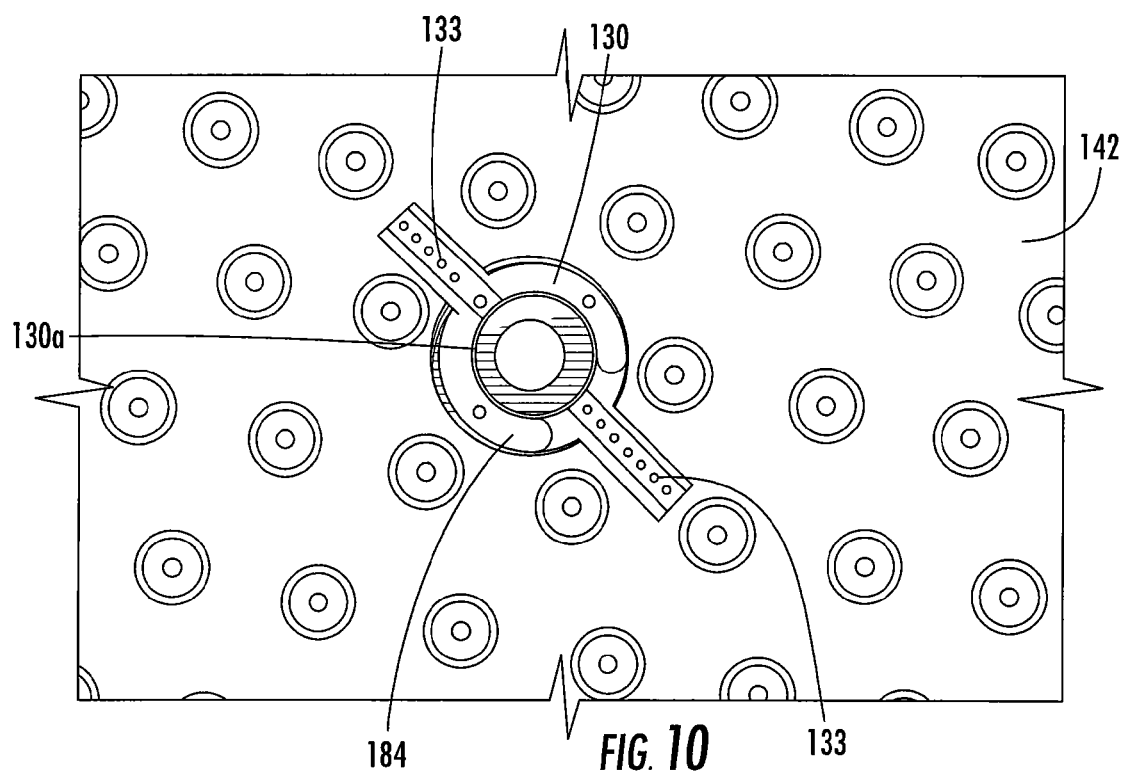
FIG. 10 is a gage view of the portion of the suction roll of FIG. 9 with a sensor residing in the counterbore.
Figure 11:
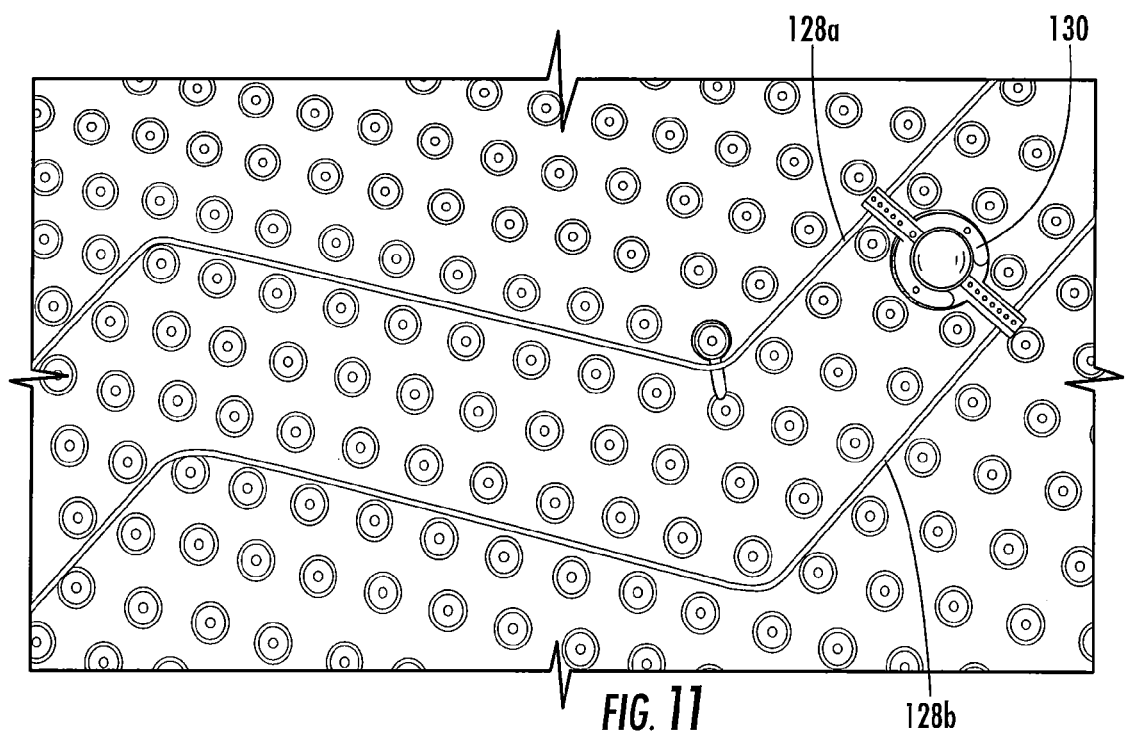
FIG. 11 is a gage view of the portion of the suction roll of FIG. 9 with leads attached to the sensor.

Referring now to FIGS. 9-11, a portion of a roll according to additional embodiments of the invention, designated broadly at 120, is shown therein. In this roll 120, a counterbore 184 is formed around the through hole 182 over which a sensor 130 will reside (see FIG. 9). The sensor 130 is inverted from its orientation in the roll 20, such that the body 130a of the sensor 130 nestles within the counterbore 184, and the wings 133 of the sensor 130 rest on the surface of the inner base layer 142a (see FIG. 10). In this arrangement, the body 130a of the sensor 130 does not protrude above the surface of the inner base layer 142a, with the result that the outer base layer 142b may not require grinding after application. Also, the presence of the counterbore 184 eliminates the need for a rivet to center the sensor 130 and maintain its position.

As can be seen in FIG. 11, leads 128a, 128b can be attached to the wings 133 as discussed above. In the illustrated embodiment, the leads 128a, 128b follow a three-segment "herringbone"-type path between the columns and rows of the through holes 182. Those skilled in this art will appreciate that the leads between sensors may employ additional numbers of segments as they are routed between the rows and columns of through holes. Also, it can be see that the "columns" and "rows" of holes need not be arranged along perpendicular axes; as an example, the holes shown in FIGS. 9-11 are arranged on axes that are rotated by approximately 60 degrees.

Figure 13:
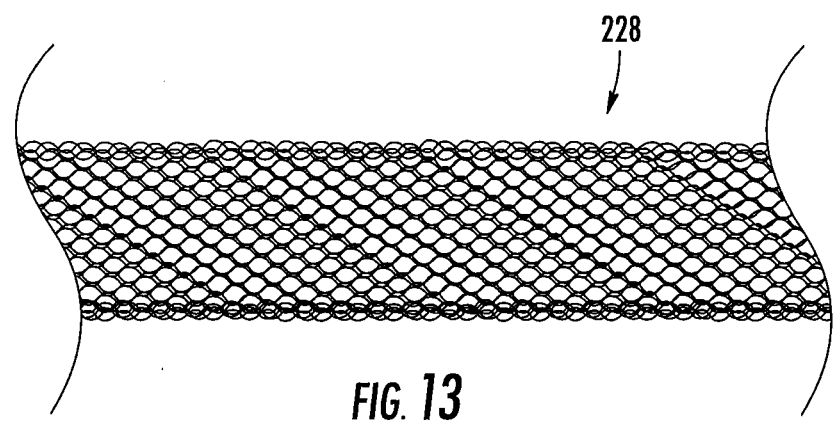
FIG. 13 is a top view of a mesh material used in electrical leads according to embodiments of the invention.
Figure 14:
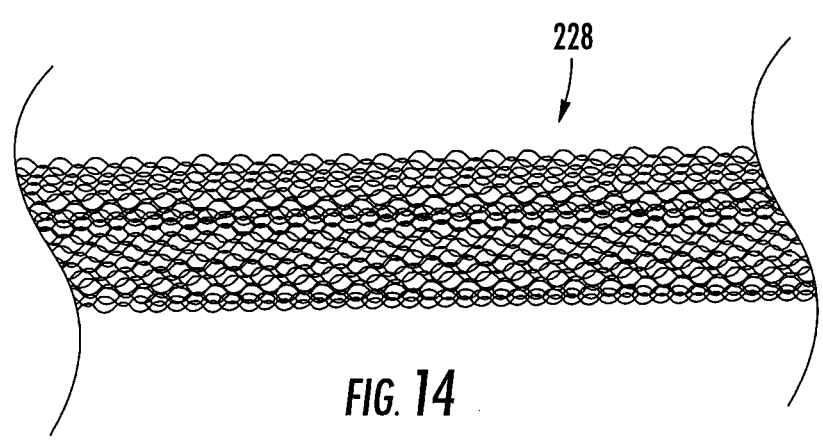
FIG. 14 is a top view of the mesh material of FIG. 13 after processing.
Figure 15:
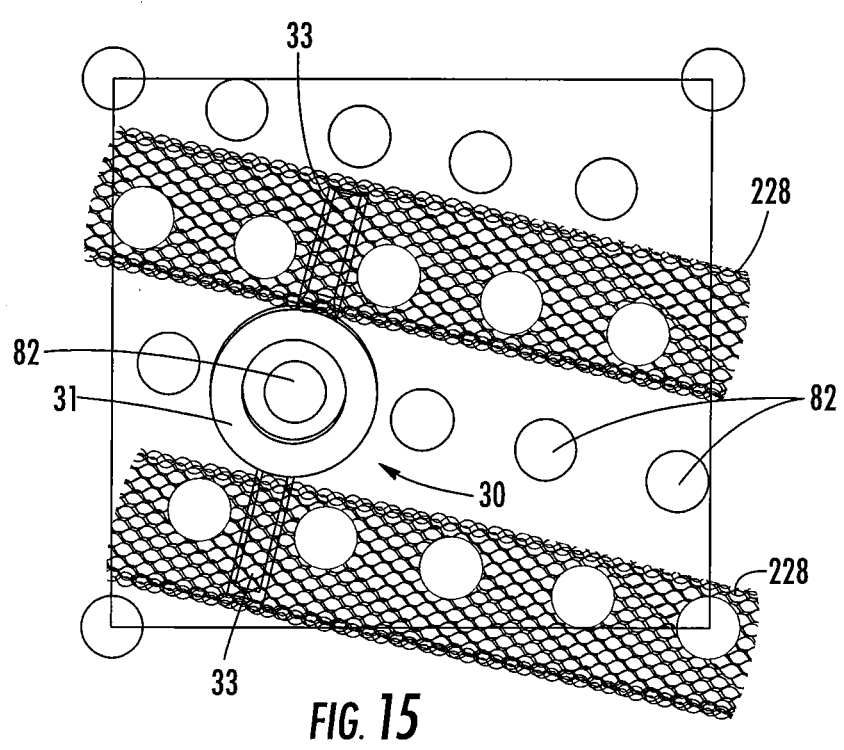
FIG. 15 is a top view of a sensor and mesh leads as in FIG. 14 within a pattern of holes according to embodiments of the invention.

Another technique for addressing the issue of lead arrangement and management can utilize a conductive mesh material, such as that illustrated in FIGS. 13-15, as the electrical leads 228 of the sensor system. The conductive mesh material leads 228 can be applied to the roll and connected to the sensors as discussed above and as shown in FIG. 15, wherein leads 228 are attached to the wings 233 of a sensor 230. Because the mesh leads 228 are relatively wide in the circumferential dimension (e.g., 0.5 inch) and extend between at least adjacent rows and/or columns of an array of through holes 282 of the roll, the through holes 282 may be formed through the leads 228, creating openings therein that are aligned with the through holes 282; however, the width of the leads 228 enables the leads 228 to remain contiguous and therefore maintain their electrical integrity. As such, the leads 228 need not be routed between the rows and columns of the suction holes 282, but can simply be laid onto the roll in any desired arrangement as shown in Figure.

In some embodiments, the leads 228 are formed as a tube that is then flattened prior to application to the roll. In some embodiments, the leads 228 are formed of a ductile metallic material, such as copper, nickel, copper-nickel alloys, silver, gold, or the like. In some embodiments, the mesh is a knitted mesh formed of a single strand of wire. An exemplary mesh material for the leads is MONEL® material, available from Parker Chomerics (Woburn, Mass.).

Prior to application of the mesh material to the roll, it may be processed to improve its electrical properties. For example, it may be dip-soldered in a tin-lead solder bath or the like. Such a soldering process can bond the strands of wire together to improve the electrical integrity of the mesh material.

Sensors may be connected to the conductive mesh material by one or more of the following methods: soft soldering, welding, conductive epoxy or conductive Z-axis tape. Other methods may be employed based on the current state of the art.

Notably, the presence of the openings or interstices of the mesh enables epoxy or other material used to bond the roll cover to the core to pass through the mesh, thereby improving bonding and reducing the chance of delamination of the roll cover from the roll.

The expanded width concept for the leads can be applied to other potential lead materials also. For example, the mesh material may be braided material rather than a knitted material. Alternatively, the lead may be a flat strip of some width (e.g., 0.002 to 0.010 inch in thickness and 0.5 inch in width) that includes perforations or other openings in order to enable the aforementioned epoxy to flow through for bonding purposes. In some embodiments, the flat strip may lack perforations. In any of these variations, the expanded width lead can maintain its electrical integrity even after the through holes of a suction roll are formed entirely or partially through the lead. An aspect ratio of width to thickness of at least 20/1 may be desirable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:
    a substantially cylindrical shell having an outer surface and an internal lumen;
    a polymeric cover circumferentially overlying the shell outer surface, wherein the shell and cover have a plurality of through holes that provide fluid communication between the lumen and the atmosphere; and
    a sensing system comprising:
        a plurality of sensors embedded in the cover, the sensors configured to sense an operating parameter of the roll and provide signals related to the operating parameter;
        at least one signal-carrying member connected with at least one of the sensors, wherein the signal-carrying member includes openings that align at least partially with some of the through holes of the shell and cover; and
        a processor operatively associated with the sensors that processes signals provided by the sensors.

2. The industrial roll defined in claim 1, wherein at least some of the sensors include an aperture, and wherein some of the through holes of the cover extend through respective apertures of the sensors.

3. The industrial roll defined in claim 2, wherein the apertures are internal apertures.

4. The industrial roll defined in claim 2, wherein the sensors are generally circular.

5. The industrial roll defined in claim 1, wherein the sensors are formed of a piezoelectric material.

6. The industrial roll defined in claim 1, wherein each of the electrical leads contacts a common surface of one of the sensors.

7. The industrial roll defined in claim 1, wherein the sensor is configured to sense pressure.

8. The industrial roll defined in claim 1, wherein the cover includes a base layer that circumferentially overlies the shell and a topstock layer that circumferentially overlies the base layer, and wherein the sensors are embedded in the base layer.

9. The industrial roll defined in claim 8, wherein the base layer includes an inner base layer and an outer base layer, and wherein the sensors are disposed to overlie the inner base layer and underlie the outer base layer.

10. The industrial roll defined in claim 8, wherein the base layer comprises rubber or an epoxy-based composite material.

11. The industrial roll defined in claim 8, wherein the topstock layer is formed of a material selected from the group consisting of: rubber, polyurethane and epoxy composite.

12. The industrial roll defined in claim 1, wherein the signal-carrying member comprises a metallic mesh, wherein the openings comprise interstices in the mesh.

13. The industrial roll defined in claim 1, wherein the signal-carrying member comprises a strip with perforations.

14. The industrial roll defined in claim 1, wherein the through holes are arranged in an array of rows and columns, and wherein the signal-carrying member has a width that extends between at least adjacent rows or adjacent columns.

15. An industrial roll, comprising:
    a substantially cylindrical shell having an outer surface and an internal lumen;
    a polymeric cover circumferentially overlying the shell outer surface, wherein the shell and cover have a plurality of through holes that provide fluid communication between the lumen and the atmosphere; and
    a sensing system comprising:
        a plurality of sensors embedded in the cover, the sensors configured to sense an operating parameter of the roll and provide signals related to the operating parameter, wherein at least some of the sensors include an aperture, and wherein some of the through holes of the cover extend through respective apertures of the sensors;

a plurality of centering members inserted through the apertures of the sensors and into the through holes, each of the centering members having an internal bore that permits fluid communication between the lumen and the atmosphere; and a processor operatively associated with the sensors that processes signals provided by the sensors.

16. The industrial roll defined in claim 15, wherein the apertures are internal apertures.

17. The industrial roll defined in claim 16, wherein the sensors are generally circular.

18. The industrial roll defined in claim 17, wherein the sensors are formed of a piezoelectric material.

19. The industrial roll defined in claim 18, wherein the sensing system further comprises two electrical leads that interconnect each of the plurality of sensors.

20. The industrial roll defined in claim 19, wherein each of the electrical leads contacts a bottom surface of one of the sensors.

21. The industrial roll defined in claim 19, wherein each of the electrical leads contacts a bottom surface of one of the sensors.

22. The industrial roll defined in claim 15, wherein the sensor is configured to sense pressure.

23. The industrial roll defined in claim 15, wherein the cover includes a base layer that circumferentially overlies the shell and a topstock layer that circumferentially overlies the base layer, and wherein the sensors are embedded in the base layer.

24. The industrial roll defined in claim 23, wherein the base layer includes an inner base layer and an outer base layer, and wherein the sensors are disposed to overlie the inner base layer and underlie the outer base layer.

25. The industrial roll defined in claim 23, wherein the base layer comprises rubber or an epoxy-based composite material.

26. The industrial roll defined in claim 23, wherein the topstock layer is formed of a material selected from the group consisting of: rubber, polyurethane and epoxy composite.

27. An industrial roll, comprising:
a substantially cylindrical shell having an outer surface and an internal lumen;
a polymeric cover circumferentially overlying the shell outer surface, wherein the shell and cover have a plurality of through holes that provide fluid communication between the lumen and the atmosphere, the through holes being arranged in an array of rows and columns; and
a sensing system comprising:
a plurality of sensors embedded in the cover, the sensors configured to sense an operating parameter of the roll and provide signals related to the operating parameter, wherein at least some of the sensors include an aperture, and wherein some of the through holes of the cover extend through respective apertures of the sensors;
a processor operatively associated with the sensors that processes signals provided by the sensors; and
at least one signal-carrying member connected with at least one of the sensors, the signal-carrying member comprising a first segment that is routed between two columns of through holes and a second segment merging with the first segment that is routed between two rows of through holes.

28. The industrial roll defined in claim 27, wherein the at least one signal carrying member is two electrical leads.

29. The industrial roll defined in claim 28, wherein the electrical leads are routed between two of the plurality of sensors.

30. The industrial roll defined in claim 27, wherein the plurality of sensors are arranged as a single-coil helix along the length of the roll.

31. An industrial roll, comprising:
a substantially cylindrical shell having an outer surface and an internal lumen;
a polymeric cover circumferentially overlying the shell outer surface, wherein the shell and cover have a plurality of through holes that provide fluid communication between the lumen and the atmosphere; and
a sensing system comprising:
a plurality of sensors embedded in the cover, the sensors configured to sense an operating parameter of the roll and provide signals related to the operating parameter, wherein at least some of the sensors include an aperture, wherein some of the through holes include a counterbore, each of the sensors residing in a respective counterbore, the through holes of the cover extending through respective internal apertures of the sensors; and
a processor operatively associated with the sensors that processes signals provided by the sensors.

32. The industrial roll defined in claim 31, wherein the sensing system further comprises at least two electrical leads that interconnect each of the plurality of sensors.

33. The industrial roll defined in claim 32, wherein each of the electrical leads contacts a top surface of one of the sensors, the top surface of the surface facing away from the counterbore.

* * * * *